Patented Jan. 4, 1949

2,458,075

UNITED STATES PATENT OFFICE 2,458,075

PROCESS FOR PREPARATION OF THIOLESTERS

Chester M. Himel, Bartlesville, Okla., assignor to Phillips Petroleum Company, a corporation of Delaware No Drawing. Application January 10, 1946, Serial No. 640,385

12 Claims. (Cl. 260—455)

This invention relates to a process for the preparation of thiolesters from tertiary mercaptans. A specific embodiment relates to a method for the synthesis of thiolesters by the interaction of unsubstituted nitriles with tertiary aliphatic mercaptans.

I have found that thiolesters of tertiary aliphatic mercaptans possess many advantages over other types of esters when they are employed as plasticizing agents for natural and artifical rubbers, various alkyd resins and numerous other polymeric materials. For example, thiolesters prepared from tertiary aliphatic mercaptans show a remarkable resistance toward hydrolytic reactions while other esters are known to undergo hydrolysis with relative ease. The superiority of the thiolesters of the present invention is also manifested in their increased compatibility toward many natural and synthetic resinous materials. While the reasons for these improved properties are not clearly understood, it is probable that the presence of the sulfur atom in the ester structure and also the highly branched nature of the carbon chain of the tertiary mercaptans utilized are at least partially responsible for the unexpected properties of the compounds herein described.

It is an object of the present invention to prepare thiolesters of tertiary mercaptans. Another object of the invention is to prepare such thiolesters by reaction of unsubstituted nitriles with tertiary aliphatic mercaptan material. A further object is provide a process for preparing, from readily available materials, thiolesters which are useful as plasticizing and modifying agents for synthetic and natural resins and other polymeric materials, and which possess improved stability toward saponification reactions. Further objects and advantages will be apparent, to one skilled in the art, from the accompanying disclosure and discussion.

The compounds with which this invention is concerned have the general formula

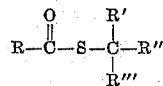

where the R's represent various hydrocarbon radicals. For example, R may comprise unsubstituted alkyl groups, from methyl to those with long hydrocarbon chains, as well as aralkyl and aryl radicals, and R', R", and R''' may each represent alkyl radicals of such chain length that the group

contains from four to about twenty carbon atoms.

According to the process of this invention, tertiary aliphatic mercaptans may be readily converted to thiolesters by the interaction of said mercaptans with nitriles in the presence of acids, such as hydrochloric, sulfuric or phosphoric acid. Although it is well known that tertiary mercaptans show a pronounced tendency to eliminate hydrogen sulfide under the influence of heat or the action of acids, I have found that reaction conditions may be controlled in such a way that thiolester formation is the predominant reaction. Thus, it has been found advisable to carry out the reaction at relatively low temperatures while at the same time maintaining a satisfactory reaction rate. It is also possible, by regulating the pressure to suit the particular reaction system at hand, to minimize undersirable side reactions if not entirely eliminate them. The rate of addition of the acid, as well as the manner in which it is introduced, likewise exerts a controlling influence on the course of the reaction.

The process in a more specific embodiment comprises charging approximately equimolecular quantities of the nitrile and tertiary mercaptan to a reactor provided with any conventional means for stirring or otherwise agitating the reactants and a device for introducing gaseous hydrogen chloride. Dry hydrogen chloride is metered into the reactor at a slow rate to insure maximum absorption of the gas and in such a way as to prevent localization of the acid which would promote the formation of extraneous materials and decrease the yield of the thiolester. After a period of three to six hours, or until the reactor charge becomes homogeneous, the reaction mixture is cooled to room temperature by any suitable cooling means and the reactor contents treated with water. Upon completion of the reaction, such as after two or more hours, the organic and aqueous layers are separated, and the product is water washed, dried and purified by distillation.

The reactants of the present invention comprise nitriles and tertiary aliphatic mercaptans. Nitriles are particularly applicable for this reaction on account of their availability. The nitriles suitable for use in the present process may be aliphatic in nature, ranging from those of low molecular weight such as acetonitrile to long-chain compounds, or aromatic nitriles such as benzonitrile. It is also to be understood that compounds such as benzyl cyanide are not excluded from the process of this invention. The mercaptans employed in the synthesis of the thiolesters herein described are tertiary aliphatic mercaptans and the compounds particularly applicable range from those containing four to about twenty carbon atoms per molecule. While in specialized cases pure individual mercaptans may be desirable, commercially available mixtures of isomers are satisfactory for many purposes. Mixtures of such tertiary mercaptans are now available through the catalytic addition of hydrogen sulfide to selected fractions of polymerized isoolefins, and to gaseous as well as normally liquid products of thermal and catalytic cracking of petroleum distillates. The tertiary mercaptans which find most general application are mixtures of isomeric compounds, for example those formed from polymer fractions having at least eight carbon atoms per molecule.

I have found that my process can most readily be carried out in the presence of acids. The materials most generally applicable are hydrochloric, sulfuric and phosphoric acids. Hydrochloric acid is usually preferred since it can be added in gaseous form and the rate and method of addition are easily controlled. These factors assume considerable importance in the present process since their influence in preventing the formation of undesirable by-products is significant.

Satisfactory temperatures for the operation of the present invention may range from 0 to 100° C. or higher throughout the process, depending upon the mercaptan chosen. In general, slightly elevated temperatures are preferred but limitations are imposed on account of the instability of certain of the mercaptans especially in the presence of acidic materials. However, by a proper control of the temperature a satisfactory reaction rate may be realized with a negligible amount of mercaptan decomposition.

Atmospheric pressure is usually preferred in the operation of the present process. However, in some cases superatmospheric pressures up to about 400 pounds per square inch gage or higher are desirable in order to facilitate absorption of hydrogen chloride and decrease reaction time as well as to effect an increase in the yield of thiolester.

*Example I*

Tertiary butyl thiolacetate was prepared by the interaction of one mol of acetonitrile with one mol of tertiary butyl mercaptan in the presence of hydrogen chloride. The mixture of mercaptan and nitrile was charged to a three-neck flask of one liter capacity fitted with a stirrer, thermometer and gas inlet tube. The reaction mixture was heated to 55° C. while dry hydrogen chloride was added through a bubble tube. After four hours the reactor contents were cooled to room temperature and addition of HCl was continued for three hours. About 25 ml. of water was then added and the material stirred and refluxed six hours. The product was washed with water and dried. Distillation yielded 20 grams of the thiolester, B. P. 120 to 130° C., $N_D^{20}$ 1.4500.

*Example II*

The synthesis of a thiolester was accomplished by the slow addition of dry hydrogen chloride gas to a well stirred mixture of equimolecular quantities of acetonitrile and tert-$C_{12}$ mercaptan while room temperature was maintained. The reaction mixture became homogeneous after four hours. Stirring was continued for an additional two hours after which water was added and the reactor contents again stirred at room temperature for eight hours. From 0.5 mol (21 g.) acetonitrile and 0.5 mol (100 g.) tert-$C_{12}$ mercaptan, a 13 per cent yield was obtained of tert-dodecyl thiolacetate, b. p. 85 to 95° C. at 3 mm. Hg pressure, $n_D^{20}$, 1.4785.

The nitrile reactants to be used have the general formula R—C≡N where R is an unsubstituted alkyl, aralkyl, or aryl radical. The mercaptan reactants have up to about 20 carbon atoms per molecule, and are of the general formula

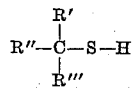

where R′, R″, and R‴ each is an alkyl radical.

I claim:

1. A process which comprises reacting in the presence of an acid a compound of the general formula $$R\text{—}C\equiv N$$

where R is an unsubstituted hydrocarbon radical selected from the group consisting of alkyl, aralkyl, and aryl radicals, with a compound of the general formula

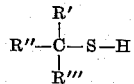

where R′, R″, and R‴ each is an alkyl radical and the total number of carbon atoms in the molecule does not exceed twenty, treating the resulting material with water, and recovering a so-produced thiolester of the general formula

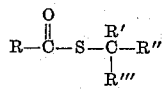

2. The process of claim 1, wherein said reacting is effected in the presence of anhydrous hydrogen chloride.

3. The process of claim 1, wherein said reacting is effected by slow addition of a stream of gaseous hydrogen chloride to a liquid mixture of said compounds at a temperature in the range of about 0 to about 100° C. for a period of several hours.

4. The process of claim 1, wherein said resulting material is treated with water for a period of several hours.

5. The process of claim 1, wherein said acid is a strong mineral acid.

6. The process of claim 1, wherein said second-named compound is tertiary butyl mercaptan.

7. A process for producing thiolesters of tertiary mercaptans which comprises slowly adding a gaseous stream of hydrogen chloride to a liquid mixture of substantially equimolar quantities of a nitrile of the general formula $$R\text{—}C\equiv N$$

where R is an unsubstituted hydrocarbon radical selected from the group consisting of alkyl, aralkyl, and aryl radicals, and a tertiary mercaptan of the general formula

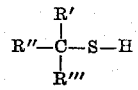

where R', R'', and R''' each is an alkyl radical, over a period of several hours until the reaction mixture becomes homogeneous while maintaining a temperature within the range of about 0 to about 100° C. and below that at which substantial mercaptan decomposition occurs, intimately contacting the resulting reaction mixture with water for a period of several hours while maintaining a temperature within the range of about 0 to about 100° C., separating the resulting organic layer from the resulting aqueous layer, water-washing the so-separated organic layer, and recovering therefrom by distillation the thiolester so produced.

8. The process of claim 7, wherein the total number of carbon atoms in the molecule of said mercaptan does not exceed twenty.

9. The process of claim 7, wherein said tertiary mercaptan is tertiary butyl mercaptan.

10. A process which comprises reacting a nitrile of the general formula $$R-C \equiv N$$

where R is an unsubstituted hydrocarbon radical selected from the group consisting of alkyl, aralkyl, and aryl radicals, with a tertiary mercaptan mixture produced by the catalytic addition of hydrogen sulfide to an olefin polymer fraction, in the presence of effective amounts of a strong mineral acid, treating the resulting material with effective amounts of water to produce thiolester of said tertiary mercaptan material, and recovering said thiolester as a product of the process.

11. The process of claim 10, wherein said tertiary mercaptan mixture contains at least about eight carbon atoms per molecule.

12. The process of claim 10, wherein said tertiary mercaptan mixture contains about twelve carbon atoms per molecule.

CHESTER M. HIMEL.

REFERENCES CITED

The following references are of record in the file of this patent:

UNITED STATES PATENTS

| Number | Name | Date |
| --- | --- | --- |
| 2,212,895 | Allen | Aug. 27, 1940 |
| 2,259,869 | Allen | Oct. 21, 1941 |

OTHER REFERENCES

Schmidt, Ber. deutsch, Chem. Ges. 47, 2546–2548 (1914).